Nov. 13, 1934.   O. E. LONG ET AL   1,980,345

FISHING REEL

Filed May 4, 1934

INVENTORS:
Oniel E. Long
& Robert C. Swigerd,

By O. O. Martin
THEIR ATTORNEY.

Patented Nov. 13, 1934

1,980,345

UNITED STATES PATENT OFFICE 1,980,345

FISHING REEL

Oniel E. Long and Robert C. Swigerd, Los Angeles, Calif.

Application May 4, 1934, Serial No. 723,914

11 Claims. (Cl. 242—84.5)

This invention has relation to fishing reels of the type in which a spool is freely rotatable and in which its rotation may be perfectly controlled by the operating handle of the reel.

The general object of the invention is the provision of a simple and inexpensive device of sensitiveness and durability. A particular object is to provide a loading device by means of which a fixed relation between braking pressure and force of pull on the line may be automatically maintained. Another object is the provision of means for absorbing shocks against the operator's fingers due to sudden violent pulls on the line. A further object is to provide a structure in which the friction incidental to control of the line drag is confined to the control elements and does not extend to the remainder of the structure.

Figure 1:
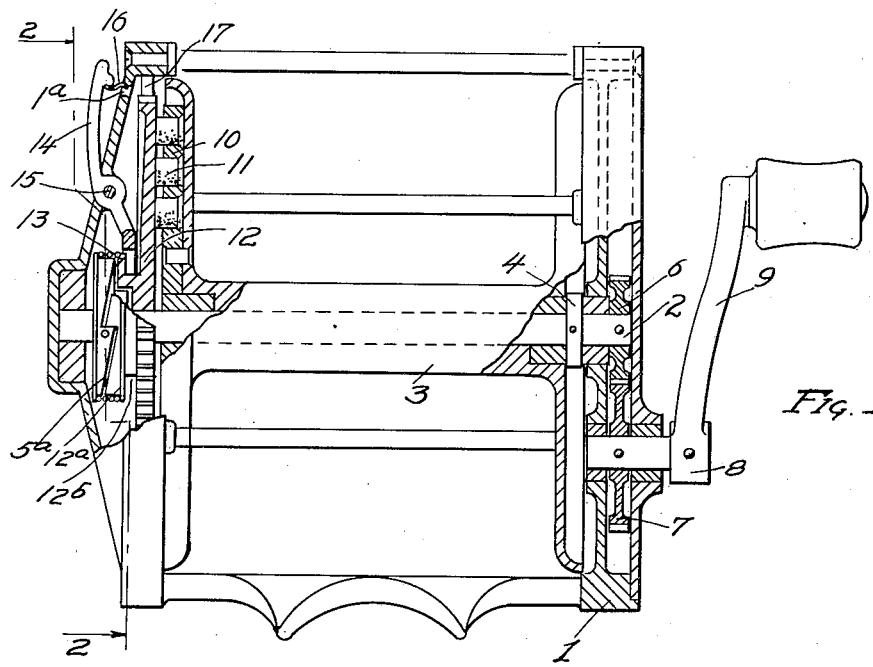
Figure 3:
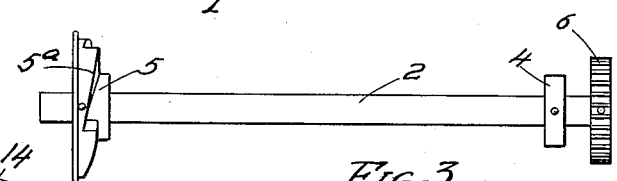
Figure 2:
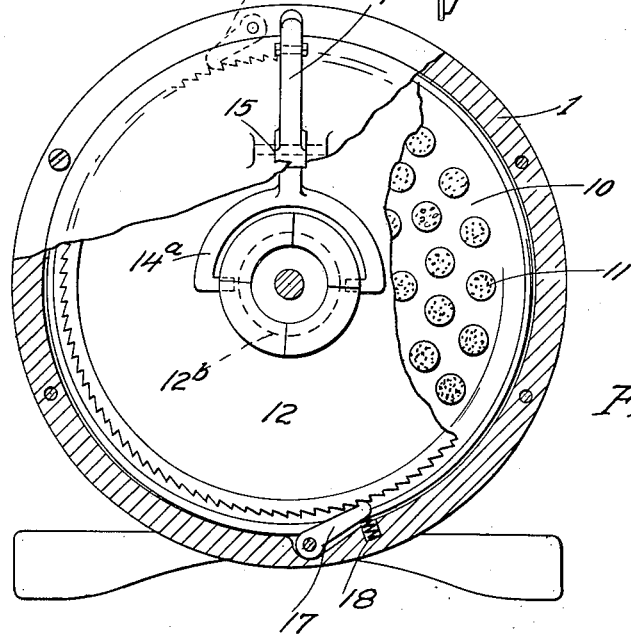

These and the further objects and advantageous features of the invention are hereinafter fully described and illustrated in the appended drawing, of which;

Fig. 1 is a side elevation, partly in section, of a structure embodying the invention, Fig. 2 is a sectional elevation taken substantially on line 2—2 of Fig. 1, Fig. 3 illustrates the assembly of certain parts, the importance of which will appear presently.

The device of our invention comprises, a frame 1 of any suitable shape known in the art, in which a shaft 2 is seated to rotate. A spool 3 is mounted to rotate on this shaft between fixed members 4 and 5. On the shaft is a fixed pinion 6, in mesh with a gear wheel 7 of a stub shaft 8, to which a hand crank 9 is affixed. Rotation of the crank is directly communicated to the shaft 2, but not to the spool.

A disk 10 is secured to one of the spool ends, and this disk is shaped to support a plurality of friction members 11, abutting a driving disk 12 which also is mounted for free rotation on the shaft 2. This disk is made with a hub portion, the outer face of which is shaped to provide clutch teeth 12$^a$ for engagement with clutch teeth 5$^a$ of the shaft member 5. A spring 13, seated between shoulders of the two clutch members normally maintains the driving disk yieldingly pressed against the friction members 11 of the spool.

In the hub of the driving member 12 is cut an annular groove 12$^b$, in which the bifurcated inner end 14$^a$ of a release lever 14 is seated. This lever is pivotally hung at 15, on the frame 1, and it is operable by pressing its outer end inwardly to withdraw the driving disk from the friction members of the spool. For the purpose of locking the disk in retracted position, the lever 14 carries at its outer end a spring clip 16 which rides in a perforation 1$^a$ of the frame and comes into engagement with the edge of this perforation when the end of the lever is fully pressed in, yieldingly to hold the lever in this position. Such release is necessary as a preliminary to casting or when it is desired to permit the line to play out freely.

From this brief description, it is seen that a clockwise rotation of the crank 9 results in a counter clockwise rotation of the shaft 2, and that the inclined clutch surfaces thereby become interengaged to rotate the driving disk (providing that the release lever has not been pressed in) and with it, the spool. This is the manner of winding a line on the spool.

So long as the line offers no resistance, the clutch faces contact lightly, the pressure of the spring 13 being sufficient to prevent slippage between the driving disk and the spool. But should any object, such as a fish on the line, commence to oppose this winding operation, it is readily seen that such resistance causes the bevels 5$^a$, of the driving clutch member, to climb the bevels 12$^a$ and that this relative rotation is translated into an inward axial movement of the driving disk.

In other words, the initial pressure is obtained by the spring 13, and the clutch members form a loading device for increasing this pressure in proportion to the resistance offered by the line. But it is important to note that, because the spool and driving disk are placed between the fixed shaft members 4 and 5, the friction incidental to such loading is confined to these parts and utilized to control the line, and that it does not extend to any other part of the reel. Due to this loading action, slippage between the driving disk and the spool can be prevented by proper manipulation of the crank.

To those versed in the art, it is also seen that the loading mechanism described effectively operates to vary the drag in accordance with the strain put on the line when it is desired to tire out a fish which has been hooked. By moving the crank handle the slightest distance, a very sensitive drag adjustment is obtainable and the movement of the fish may be kept under perfect control.

It is noticed that we have provided ratchet teeth in the periphery of the driving disk 12, and that a plurality of pawls 17 are shown held in engagement with these teeth, by gravity or by a spring 18, as preferred. These pawls are provided to receive the shock of a sudden, violent pull on the line, which shock otherwise would be transmitted to the crank handle to the discomfort of the operator. If, at the time of such sudden pull, the crank is idle, it is seen that the spring 13 alone resists such pull and that, for this reason, the spool may slip to soften the shock, but the operator can, by manipulation of the crank, keep the slippage under perfect control. Or, if he wishes to allow the fish to run the line out freely, a slight pressure against the release lever 14 will suffice.

We claim:

1. In a fishing reel, a frame, a shaft rotatable in the frame, two collars rigidly mounted on said shaft, a spool, a driving disk, both rotatable on said shaft between said fixed shaft collars, means yieldingly pressing the disk against the end of the spool, means embodied in the disk and in one of the collars for increasing such pressure, the pressure being all taken by said collars to relieve the frame of strain, and manual means for rotating said shaft.

2. In a fishing reel, a shaft rotatable in the reel frame, two collars rigidly mounted on said shaft, a spool rotatable on said shaft between said two fixed shaft collars, a friction mechanism between the shaft and spool yieldingly resisting rotation of the spool, manual means for rotating the shaft to increase the friction of said mechanism against the spool, and means for releasing the spool from said friction mechanism, the axial pressure of said friction mechanism against the spool being taken by said collars thereby to eliminate strain on the reel frame.

3. In a reel, a rotatable shaft, a spool rotatable on the shaft, friction elements mounted on one flange of said spool, a spring-held clutch mechanism for yieldingly connecting the spool for rotation by the shaft in one direction, manual means for rotating the shaft to control the engagement of the clutch mechanism, and means for preventing rotation of the spool in the opposite direction, said means including a disk of said clutch mechanism engaging said friction elements.

4. In a reel, a rotatable shaft, a spool rotatable on the shaft, a clutch mechansm for yieldingly connecting the spool for rotation by the shaft in one direction, said mechanism including a toothed disk, friction elements between said disk and the end of the spool, manual means for rotating the shaft to control the engagement of the clutch mechanism, means engaging the teeth of said disk for preventing rotation of the spool in the opposite direction, and means for releasing the spool for free rotation in the opposite direction.

5. In a reel, a rotatable shaft, two collars rigidly mounted on said shaft, a spool for a fish line, a driving disk, both rotatable on said shaft between said fixed shaft collars, a clutch mechanism embodied in the disk and one of the collars, a resilient member yieldingly maintaining the disk pressed against the end of the spool, manual means for rotating the shaft to control the engagement of said clutch mechanism, and pawls engaging teeth of the driving disk to take the shock of a sudden pull on the line.

6. In a fishing reel, a frame, a manually rotatable shaft, two collars rigidly mounted on said shaft, a spool, a driving disk, both rotatable on the shaft between said fixed shaft collars, said disk and one of said collars having inclined interengaging clutch members, means yieldingly separating the clutch members to press said disk against the end of the spool, and a crank for rotating the shaft to engage the clutch members to increase the pressure on the spool end.

7. In a fishing reel, a frame, a manually rotatable shaft, two collars rigidly mounted on said shaft, a spool, a driving disk, both rotatable on the shaft between said fixed shaft collars, said disk and the adjacent collar having inclined interengaging clutch members, means yieldingly separating the clutch members to press the disk against the end of the spool, friction elements between the disk and the spool end, and a crank for rotating the shaft to engage the clutch members to increase the pressure on the spool.

8. In a fishing reel, a shaft, two collars rigidly mounted on said shaft, a spool, a driving disk, both rotatable on said shaft between said fixed shaft collars, said disk and the adjacent collar having inclined interengaging clutch members, means yieldingly separating the clutch members axially to press the disk against the end of the spool, a crank for rotating the shaft to bring the clutch members into engagement to increase the pressure on the spool, and manually operated means for yieldingly maintaining the disk out of engagement with the spool end.

9. In a fishing reel, a shaft, two collars rigidly mounted on said shaft, a spool, a driving disk, both rotatable on said shaft between said fixed shaft collars, said disk and the adjacent shaft collar having inclined interengaging clutch members, means yieldingly separating the clutch members axially to press the disk against the end of the spool, friction elements between the disk and spool end, a crank for rotating the shaft to bring the clutch members into engagement to increase the frictional pressure on the spool, and a lever for withdrawing the disk from the spool end, said lever having a resilient member engaging the frame yieldingly to maintain the disk withdrawn from the spool.

10. In a reel, a rotatable shaft provided with a shoulder, a spool rotatable on said shaft, means between said shaft and one end of said spool for frictionally inter-connecting the shaft and spool, manual means for rotating the shaft to increase the frictional pressure on the spool by said interconnecting means the frictional pressure being taken by said shoulder, and manual means for releasing the spool from such frictional interconnection.

11. In a reel, a rotatable shaft provided with a shoulder, a spool rotatable on said shaft, means between said shaft and one end of said spool for frictionally inter-connecting the shaft and spool for common rotation in the same direction, manual means for rotating the shaft to increase the frictional pressure on the spool by said interconnecting means the frictional pressure being taken by said shoulder, and manual means for releasing the spool from such frictional interconnection.

ONIEL E. LONG.
ROBERT C. SWIGERD.